J. T. HAMILTON.
WIPERS FOR FIRE-ARMS.
No. 189,455. Patented April 10, 1877.
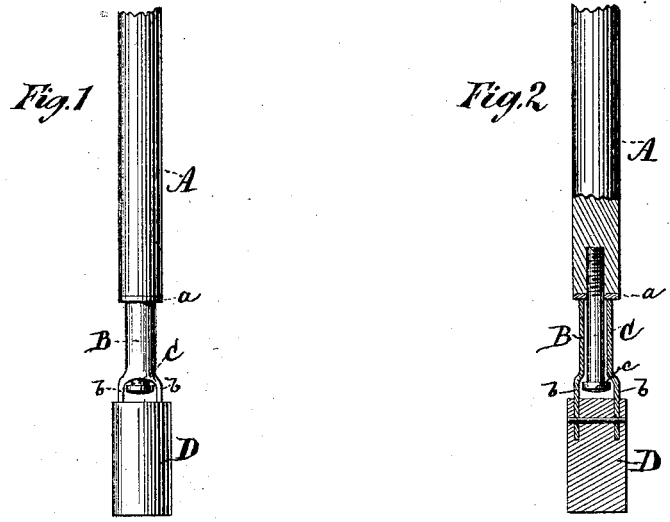
Witnesses:
E. R. Brown
L. Lees
Jas. T. Hamilton

UNITED STATES PATENT OFFICE.

JAMES T. HAMILTON, OF BROOKLYN, NEW YORK.

IMPROVEMENT IN WIPERS FOR FIRE-ARMS.

Specification forming part of Letters Patent No. 189,455, dated April 10, 1877; application filed March 13, 1877.

*To all whom it may concern:*

Be it known that I, JAMES T. HAMILTON, of Brooklyn, in the county of Kings and State of New York, have invented a new and useful Improved Swab or Wiper for Fire-Arms; and I do hereby declare that the following is a full, clear, and exact description thereof.

My invention relates to a device which is more particularly intended for use in connection with heavy guns, but is applicable to rifled fire-arms of every description.

The invention consists in a swab or wiper provided with means for connecting or attaching it to a rammer or wiper-rod by a swivel-connection, whereby provision is made for enabling the swab or wiper to follow the direction of the rifling of the barrel without imparting a rotary motion to the rammer or wiper-rod.

In carrying out my invention, the swivel-connection may be made by a hook and eye or a ball-and-socket joint, or any other suitable means, and the swab or wiper may be attached, by said swivel-connection, either directly to the rammer or wiper-rod, or to a socket or other device, which may be readily attached to and removed from said rod at pleasure.

The accompanying drawing illustrates a mode of carrying out my invention, Figure 1 being a side view of a wiper and rod, and Fig. 2 a longitudinal sectional view of the same.

A represents a wiper-rod, of any suitable construction. B is a bifurcated tube or sleeve, having branches $b$ $b$ at one end. D is the swab or wiper, which may be of any suitable material, and to this swab or wiper the branches $b$ $b$ of the sleeve are secured.

As represented in the drawing, the connection of the swab with the rod A is made by means of a screw, C, passing through the sleeve B, and into the end of the rod A, the head $c$ of the screw bearing against the lower end of the sleeve, and a washer, $a$, being interposed between the contiguous ends of the sleeve and of the rod; but, if desired, the part C may be a portion of, or be permanently attached to, the rod A, and instead of the screw-head $c$, a nut may be used on the end of the part C; or the upper end of the screw C may be provided with a socket, into which the end of the rod A may be inserted.

When the swab is used in connection with a rammer or wiper-rod, such as those accompanying the muskets or rifles in common use, the screw-threaded end of said rod may be passed through the sleeve B, and secured by a nut occupying the place of the screw-head $c$. (Shown in the drawing.)

By the construction and mode of attachment or connection herein described, the swab or wiper, during its reciprocating motion in the barrel of a gun, is enabled to follow the direction of the rifling without causing the wiper-rod to turn or partake of a rotary or twisting motion in the hand of the operator.

What I claim as new, and desire to secure by Letters Patent, is—

A swab or wiper for fire-arms, provided with means for attaching it to a rammer or wiper-rod by a swivel or similar connection, substantially as and for the purpose herein described.

JAS. T. HAMILTON.

Witnesses:
JAS. A. PALMER,
E. R. BROWN.